UNITED STATES PATENT OFFICE.

MICHAEL A. ZDANOWSKI, OF PHILADELPHIA, PENNSYLVANIA.

METHOD OF MAKING GLAZED KID-LEATHER.

1,345,429.   Specification of Letters Patent.   Patented July 6, 1920.

No Drawing.   Application filed April 21, 1917. Serial No. 163,582.

*To all whom it may concern:*

Be it known that I, MICHAEL A. ZDANOWSKI, a citizen of the United States, residing in the city and county of Philadelphia, State of Pennsylvania, have invented a new and useful Method of Making Glazed Kid-Leather, of which the following is a specification.

My present invention consists of a novel method of making glazed kid leather, and as a result of my novel method, the leather is waterproof, soft, elastic and plump, and has a smooth silky grain.

In carrying out my invention in practice, I take the skins or hides and first soak them in water to which salt has been added in the proportion of one-half to one ounce of common salt to one gallon of water.

The skins are then dehaired, for example by soaking in a solution formed by boiling lime and red arsenic sulfid in water. The skins are then washed in water and bated in any desired manner, such as for example, with dog manure.

The skins are then subjected to three successive tanning baths. The first bath is formed by adding to one hundred gallons of water at a temperature of about 80° F., six to ten pounds of salt, and from one to four pounds of sulfate of aluminum. Both the salt and the sulfate of aluminum are separately heated in closed pots before using, in order to drive off any impurities.

The above solution is used to every hundred pounds of skins. This first bath is placed in the paddle wheel and the skins or hides are also placed in the paddle wheel and the latter is turned for about half an hour, after which the skins are removed and drained. The sulfate of aluminum is heated until it partially decomposes. If the skins or hides are heavy, the second bath is formed by taking for one hundred pounds of skins, one hundred gallons of water at about 85° F. to which is added about six pounds of dissolved potassium bichromate and about three pounds of muriatic acid at 21° Bé. For medium skins, I use for the same proportion of water, about five pounds of potassium bichromate and about two and one-half pounds of muriatic acid. For thin skins, for the same proportion of water, I use about four pounds of potassium bichromate and two and one-quarter pounds of muriatic acid. This second bath is placed in the paddle wheel and the skins placed in the paddle wheel and the latter turned until the solution has thoroughly penetrated and treated all parts of the skins.

The skins are then taken out of the solution and struck out and dipped singly in a bath consisting of fifty gallons of water in which two and one-half pounds of "hypo," this being sodium thiosulfate ($Na_2S_2O_3$) and five pounds of muriatic acid have been placed, and are placed on wooden horses for about twelve hours.

The skins are then treated in a third bath which for every hundred pounds of skins or hides which are heavy is formed by taking one hundred gallons of water, seventeen pounds of sodium thiosulfate and five pounds and ten ounces of muriatic acid, twenty-one degrees Baumé. For one-hundred pounds of medium skins, I use sixteen pounds of sodium thiosulfate and five pounds and five ounces of muriatic acid. For one hundred pounds of thin skins or hides, I use fifteen pounds of sodium thiosulfate and five pounds of muriatic acid. The muriatic acid in each case is twenty-one degrees Bé. strength.

The skins or hides in the solution are placed in the paddle wheel which is turned until the skins assume a light blue color. The skins are then washed and struck out and shaved, after which they are colored as usual.

By this process of tanning, the skins or hides can be tanned by the use of one-half to one per cent. less of potassium bichromate than has heretofore been employed, with consequent reduction in the cost of producing the leather.

It will be understood that instead of paddle wheels, the skins can be tanned in drums. After the tanning is completed, the skins are again washed, struck out, dyed as usual, oiled, dried, and staked as usual, and they are now ready for the seasoning. This seasoning is made by taking five ounces of water, one dram of nigrosine, two grains of carbolic acid #5, two drams of blood albumin or ox blood, one dram of wood alcohol or ammonia, ten grains of gelatin or glue, and fifteen grains of formaldehyde. The skins are seasoned then glazed, seasoned, and glazed again and the resultant leather is waterproof, soft, elastic and plump, with a smooth silky grain.

I have found that by melting the salt used in the first tanning bath, I can employ a cheap grade of salt. I take the sulfate of aluminum in crystallized form and melt it in closed pots until it has the consistency of glue and then pour it out and allow it to cool. This purifies the sulfate of aluminum and renders the finished leather also more dampproof. By using a first bath of this character, the skins become plump and smooth before they are subjected to the chrome process. The salt in the skin controls the action of the muriatic acid and a smaller amount of potassium bichromate is required as the skins are already partially tanned by the action of the salt and the sulfate of aluminum.

I also find that when the skins are placed in the third bath, the action of the sodium hyposulfite is better and a better tanning action is obtained. By my method, I am enabled to employ a smaller amount of potassium bichromate, hypo-sulfite of soda and muriatic acid.

In the seasoning operation, the seasoning material is rubbed into the grain side of the skin in the usual manner and the skins are then glazed by a glazing machine, using a glass agate, such as is commonly used in the manufacture of leather.

Having thus described my invention, what I claim as new and desire to secure by Letters Patent, is:—

1. The method of tanning which comprises soaking the skins in salt water, dehairing, bating and then subjecting to three successive tanning baths, the first of said baths being formed by mixing together water, salt and aluminum sulfate, the salt and aluminum sulfate being melted in a closed receptacle before using, the second bath being formed by mixing together water, a bichromate and muriatic acid, and the third bath being formed by mixing together water, sodium thiosulfate and muriatic acid.

2. The method of tanning hide which comprises subjecting the hide successively to three successive baths, the first bath being formed by mixing together salt, aluminum sulfate and water, the salt and aluminum sulfate having been first melted in a closed receptacle, the second bath containing an acidified solution of a chromate and the third bath containing an acidified solution of sodium thiosulfate.

3. The method of tanning hide which comprises subjecting 100 parts, by weight, of the hide to three successive tanning baths, the first of said baths being formed by mixing 800 parts of water at a temperature of about 80°, 6 to 10 parts of salt and about 4 parts of aluminum sulfate, the second bath consisting of a mixture of 800 parts of water at 85° and a soluble bichromate and muriatic acid, the two latter being in the ratio of about 2:1, the third bath consisting of about 800 parts of water containing sodium thiosulfate and muriatic acid, the two latter being in about the ratio of 3:1.

4. The method of tanning hide which consists in subjecting hide to the action of three successive baths, the first of which is formed by dissolving salt and sulfate of aluminum, previously fused, in warm water, the second bath consisting of a warm acidified solution of a soluble bichromate and the third bath consisting of an acidified solution of a thiosulfate.

5. The improvement in the art of tanning which consists in subjecting the skins to the action of a tanning bath containing salt and aluminum sulfate, the said salt and aluminum sulfate being each melted before dissolving the same in water.

6. The improvement in the art of tanning which consists in subjecting the skins to the action of a tanning bath containing about 6 to 10 pounds of salt and about 1 to 4 pounds of aluminum sulfate to each 100 gallons of water, the salt and aluminum sulfate being melted before dissolving them in water.

7. The method of tanning hide, which consists in subjecting each 100 pounds of the hide to three successive baths, the first of which contains 6 to 10 pounds of common salt, 1 to 4 pounds of aluminum sulfate, the second of which contains to 100 gallons of warm water about four and one-half pounds of an alkali metal bichromate and about two and one-quarter pounds of muriatic acid, the third bath containing about 15 pounds of sodium thiosulfate and about 5 pounds of muriatic acid.

8. The process of tanning, which comprises the succession of steps of (a) subjecting the depilated and bated hides to a solution containing previously melted salt and aluminum sulfate, (b) thereafter subjecting the same to treatment with an acidified chromate solution, and (c) thereafter subjecting the same to a solution of "hyposulfite."

9. In the preparation of a tanning solution containing salt and aluminum sulfate, the step of melting the salt and aluminum sulfate before dissolving the same in water.

MICHAEL A. ZDANOWSKI.

Witnesses:
H. S. FAIRBANKS,
C. D. McVAY.